United States Patent
McGrath

(10) Patent No.: US 7,015,650 B2
(45) Date of Patent: Mar. 21, 2006

(54) CIRCUIT DEVICES, CIRCUIT DEVICES WHICH INCLUDE LIGHT EMITTING DIODES, ASSEMBLIES WHICH INCLUDE SUCH CIRCUIT DEVICES, FLASHLIGHTS WHICH INCLUDE SUCH ASSEMBLIES, AND METHODS FOR DIRECTLY REPLACING FLASHLIGHT BULBS

(75) Inventor: William R. McGrath, Randolph, VT (US)

(73) Assignee: LEDdynamics, Randolph, VT (US)

( * ) Notice: Subject to any disclaimer, the term of this patent is extended or adjusted under 35 U.S.C. 154(b) by 155 days.

(21) Appl. No.: 10/790,293

(22) Filed: Mar. 1, 2004

(65) Prior Publication Data

US 2004/0189262 A1 Sep. 30, 2004

Related U.S. Application Data

(60) Provisional application No. 60/453,253, filed on Mar. 10, 2003.

(51) Int. Cl.
 *F21L 4/02* (2006.01)
 *H05B 37/02* (2006.01)
(52) U.S. Cl. ..................... 315/200 A; 315/86
(58) Field of Classification Search ........... 315/291, 315/224, 200 A, 200 R, 241 S, 86; 362/184, 362/205, 227, 277
 See application file for complete search history.

(56) References Cited

U.S. PATENT DOCUMENTS

| 5,894,200 A | * | 4/1999 | Goodale et al. | 315/360 |
| 6,388,390 B1 | * | 5/2002 | Rachwal | 315/200 R |
| 6,793,366 B1 | * | 9/2004 | Chun | 362/184 |
| 6,841,941 B1 | * | 1/2005 | Kim et al. | 315/86 |

OTHER PUBLICATIONS

Zetex, "ZXSC310 Solution Flashlight", Design Note 64, Issue 1—Apr. 2002.

* cited by examiner

*Primary Examiner*—Wilson Lee
(74) *Attorney, Agent, or Firm*—Burr & Brown

(57) ABSTRACT

A circuit device for providing energy to at least one electrical component, such as a light emitting diode (LED). The circuit device comprises a positive contact, an inductor, a diode and a negative contact in series. A first component contact for electrical connection to a cathode end of an electrical component, a second component contact for electrical connection to an anode end of an electrical component, a switch and a control device are also included. The first component contact is electrically connected to a junction between the positive contact and one end of the inductor; and the second component contact is electrically connected to a cathode end of the diode. There are also provided a circuit device further including an LED, an assembly including a circuit device and a bulb base, a flashlight including an assembly, and a method of directly replacing a flashlight bulb.

36 Claims, 4 Drawing Sheets

CIRCUIT DEVICES, CIRCUIT DEVICES WHICH INCLUDE LIGHT EMITTING DIODES, ASSEMBLIES WHICH INCLUDE SUCH CIRCUIT DEVICES, FLASHLIGHTS WHICH INCLUDE SUCH ASSEMBLIES, AND METHODS FOR DIRECTLY REPLACING FLASHLIGHT BULBS

CROSS-REFERENCE TO RELATED APPLICATIONS

This application claims the benefit of U.S. Provisional Patent Application No. 60/453,253, filed Mar. 10, 2003, the entirety of which is incorporated herein by reference.

FIELD OF THE INVENTION

The present invention relates to a circuit device, for providing energy to one or more electrical components, e.g., one or more light emitting diodes, an assembly including such a circuit device, as well as a circuit device including one or more light emitting diodes, an assembly which includes one or more light emitting diodes and a flashlight which includes such an assembly. The present invention further relates to a light emitting diode assembly for direct replacement of a flashlight bulb, as well as a method of directly replacing a flashlight bulb in a flashlight.

BACKGROUND OF THE INVENTION

Heretofore, flashlights incorporating light emitting diodes (LEDs) as their light sources have typically employed one or more high intensity, five millimeter LEDs. Typically, white LEDs are used and, because of their characteristic forward voltage drop, have been limited to flashlights employing three or more standard alkaline cells. Costlier units have employed two lithium cells to achieve the required voltage. To limit the current to the correct operating value, a resistor has been used, either within a bulb base or external to the LEDs. This requires that the bulb only be used with the number and type of cells for which the resistor value was selected. With such devices, the end user must, therefore, specify the number of cells with which the bulb will operate.

The use of a resistor as a current limiter is not excessively wasteful of power when LEDs requiring only 30 milliamperes are driven. The extension of such a method for use with the recently released one watt LEDs requiring 350 milliamperes means that, as a minimum, 50 percent of the energy within the battery pack is wasted as heat by the current limiting resistor. As the number of cells in the flashlight increases to greater than two cells, the wasted power increases proportionately.

There exist drive circuits for driving LEDs using battery packs. An example of such a drive circuit is a drive circuit designed by Zetex, PLC for its Zetex Type ZXSC310 LED Driver chip. This drive circuit, schematically depicted in FIG. 5, includes a control chip 550, a switching transistor 560, a current sense resistor 590, a series of LEDs 520, 521, 522 and 523, an inductor 570, a Schottky rectifier 575 and a capacitor 580. The current sensing terminal "CS" of the control chip 550 is directly tied to the junction of the switching transistor 560 and the current sense resistor 590. The cathode of the LED series 520–523 is connected to the negative side of the battery pack.

A first end of the inductor 570 is connected to the positive contact and a second end of the inductor 570 is connected to the anode end of the diode. The collector of the switching transistor 560 is connected to a junction between the second end of the inductor 570 and the anode end of the Schottky rectifier 575. The emitter of the switching transistor 560 is connected to a first end of the current sense resistor 590, and a second end of the current sense resistor 590 is connected to the negative side of the battery pack. The anode of the LED series 520–523 is connected to the cathode end of the Schottky rectifier 575. The output terminal OUT of the control chip 550 is connected to the base of the switching transistor 560. A first end of the capacitor is connected to a junction between the cathode end of the Schottky rectifier 575 and the anode of the LED series 520–523, and a second end of the capacitor is connected to a junction between the cathode of the LED series 520–523 and the negative side of the battery pack.

The control chip 550 provides a signal through the output terminal to the switching transistor 560 to break electrical connection across the transistor 560 from the collector to the emitter when voltage at the current sensing terminal exceeds a threshold value, and provides a signal through the output terminal to the switching transistor 560 to provide electrical connection across the transistor 560 from the collector to the emitter after a non-conduction period has elapsed following the breaking of the electrical connection across the switching transistor 560.

When voltage is applied to the circuit, the OUT terminal of the control chip 550 goes to a positive voltage, driving the switching transistor 560 into a conductive state. Current is drawn through the inductor 570 and increases linearly until the voltage across the current sense resistor 590 reaches a threshold point at the CS terminal of the control chip 550. When the threshold voltage is reached, the OUT terminal of the control chip 550 goes low and the switching transistor 560 ceases to conduct. The energy stored by the inductor 570 during the conduction time of the switching transistor 560 is discharged into the load presented by LEDs 520–523 through the Schottky rectifier 575. In order to maintain a constant current, the voltage across the inductor 570 will rise until the LEDs 520–523 conduct and the remaining energy in the inductor 570 will provide a constant current until the stored energy is exhausted.

A significant drawback of the Zetex circuit for the Zetex Type ZXSC310 LED Driver is that if the battery pack voltage is higher than the sum of the forward voltage drop of the driven LED plus the forward voltage drop of the Schottky rectifier 575, the LED will be subjected to overcurrent and possibly damaged. Additional LEDs are placed in a series connection to assure that the LEDs forward voltage drop is always greater than the supply voltage.

The non-conduction period of the switching transistor 560 is fixed. Therefore, the magnitude of the stored energy is determined by the input voltage, the value of the current sense resistor 590, and the threshold voltage of the CS terminal, the value of which is fixed. If the input voltage is increased, the amount of energy stored increases proportionately. Because the current delivered to the LEDs is a direct function of the stored energy, an increase in input voltage can result in excessive current being applied to the LEDs.

SUMMARY OF THE INVENTION

The present invention provides a circuit device for driving one or more electrical components (e.g., one or more LEDs), which overcomes the drawback described above. In addition, the present invention provides a circuit device for driving one or more electrical components (e.g., one or more LEDs), which circuit device significantly increases the percentage of useful power from a power source being delivered to the electrical component(s), relative to conventional circuit devices. The present invention further provides a circuit device for driving one or more electrical components (e.g., one or more LEDs) which enhances the longevity of the electrical component(s). The present invention further provides a circuit device for driving one or more electrical components (e.g., one or more LEDs) which compensates in the event that higher stored energy is experienced as a result of a higher input voltage.

The present invention further provides an assembly which can function as a drop-in replacement for a standard incandescent flashlight bulb.

The ZXSC310 circuit arrangement (described above) includes a boost-mode (voltage out is higher than voltage in) switching converter. In accordance with one aspect of the present invention, where the input voltage is higher than the forward voltage rating of the LED, it would be desirable for the device to function as a buck-mode (voltage out is lower than voltage in) converter. In accordance with another aspect of the present invention, where a multiplicity of cells which can provide an input voltage which is either higher or lower than the LED forward voltage drop, it would be desirable for the device to function in a dual mode, i.e., buck-boost. The circuitry of the ZXSC310 device lacks the ability to operate in the buck mode.

In accordance with one aspect of the present invention, there is provided a circuit device for providing energy to one or more electrical components (e.g., one or more light emitting diodes), the circuit device comprising a positive contact, a negative contact, an inductor, a diode, a first component contact for electrical connection to a cathode end of an electrical component, a second component contact for electrical connection to an anode end of an electrical component, a switch and a control device. A first end of the inductor is electrically connected to the positive contact, and a second end of the inductor is electrically connected to the anode end of the diode. A first end of the switch is electrically connected to a junction between the second end of the inductor and the anode end of the diode. A second end of the switch is electrically connected to the negative contact. The second component contact is electrically connected to the cathode end of the diode. The first component contact is electrically connected to a junction between the positive contact and the first end of the inductor. The control device has a current sensing terminal and an output terminal, the current sensing terminal being electrically connected to a junction between the second end of the switch and the negative contact, the output terminal being electrically connected to the switch. The control device causes the switch to break electrical connection across the switch when voltage at the current sensing terminal exceeds a threshold value, and causes the switch to provide electrical connection across the switch after a non-conduction period has elapsed.

A preferred switch in the circuit device described above is a switching transistor.

According to the present invention, there is also provided a light emitting diode-containing device comprising a circuit device as described above and an LED or a plurality of LEDs (arranged in series and/or parallel) electrically connected at its cathode end to the first LED contact and at its anode end to the second LED contact.

In the circuit arrangement according to the present invention as described above, the cathode of the LED is returned to the positive terminal of the power source (e.g., battery pack). In this configuration, the voltage boost created by the inductor will always be equal to the forward voltage drop of the LED plus the forward voltage drop of the diode, whereby the percentage of useful power from a power source being delivered to the LED(s) is significantly increased relative to conventional circuit devices, e.g., the ZXSC310 LED driver circuit described above.

Preferably, the circuit device further comprises a current sense resistor, a current sense series resistor, a bias resistor and a Zener diode, in which:

the cathode end of the Zener diode is electrically connected to a junction between the positive contact and the first end of the inductor, the anode end of the Zener diode is electrically connected to the first end of the bias resistor, the second end of the bias resistor is electrically connected to a junction between the first end of the current sense series resistor and the current sensing terminal, the second end of the current sense series resistor is electrically connected to a junction between the second end of the switch and the first end of the current sense resistor, and the second end of the current sense resistor is electrically connected to the negative terminal. In this circuit arrangement according to the present invention, the current sense series resistor and the bias resistor form a summing junction at the current sensing terminal of the control chip. As the input voltage is increased, the Zener diode supplies current to the bias resistor. Because the voltage at the current sense terminal is the result of the sum of the voltages created by the bias resistor and the current sense series resistor and has a fixed value, as the voltage contributed by the bias resistor increases, the voltage required across the current sense resistor to achieve the threshold value decreases. Thus the current through the current sense resistor decreases as voltage increases and constant energy storage in the inductor is achieved, resulting in constant power being delivered to the electrical component (e.g., the LED). This arrangement can thereby compensate in the event that higher stored energy is experienced, e.g., as a result of a higher input voltage.

The circuit device preferably further comprises a capacitor, a first end of the capacitor being electrically connected to a junction between the cathode end of the diode and the second component contact, a second end of the capacitor being electrically connected to a junction between the second end of the switch (or, where a current sense resister is present, the second end of the current sense resistor) and the negative contact. This capacitor serves to minimizes fluctuations resulting from the switching of the switch.

In a further aspect of the present invention, there is provided a light emitting diode receiving assembly, comprising a circuit device as described above and a bulb base in which the circuit device is positioned, and there is provided a light emitting diode assembly, comprising a circuit device as described above and having at least one LED connected therein and a bulb base in which the circuit device is positioned and to which the at least one LED is attached. Such assemblies can function as drop-in replacements for standard incandescent flashlight bulbs.

The present invention further provides a flashlight which includes circuit devices as described above.

In a further aspect of the present invention, there is provided a circuit device comprising a positive contact, a negative contact, an inductor, a first diode, a first component contact for electrical connection to a cathode end of an electrical component, a second component contact for electrical connection to an anode end of an electrical component, a switch, a control device as described above, a current sense resistor, a current sense series resistor, a bias resistor and a Zener diode, in which:

a first end of the inductor is electrically connected to the positive contact;

a second end of the inductor is electrically connected to the anode end of the first diode;

a first end of the switch is electrically connected to a junction between a second end of the inductor and the anode end of the first diode;

a second end of the switch is electrically connected to a first end of the current sense resistor;

the second component contact is electrically connected to the cathode end of the first diode;

the first component contact is electrically connected to the negative contact;

the cathode end of the Zener diode is electrically connected to a junction between the positive contact and the first end of the inductor;

the anode end of the Zener diode is electrically connected to a first end of the bias resistor;

a second end of the bias resistor is electrically connected to a junction between a first end of the current sense series resistor and the current sensing terminal;

a second end of the current sense series resistor is electrically connected to a junction between the second end of the switch and a first end of the current sense resistor; and a second end of the current sense resistor is electrically connected to the negative terminal. In this circuit arrangement according to the present invention, the current sense series resistor and the bias resistor form a summing junction at the current sensing terminal of the control chip, and can thereby compensate in the event that higher stored energy is experienced, e.g., as a result of a higher input voltage.

The present invention also provides a method of directly replacing a flashlight bulb, comprising inserting into a flashlight body a light emitting diode assembly in accordance with the present invention as described above.

The invention may be more fully understood with reference to the accompanying drawings and the following detailed description of the invention.

BRIEF DESCRIPTION OF THE DRAWING FIGURES

Fib. 3C is a front elevation view of a bulb base 10 with the lower portion having been textured.

Figure 3A:
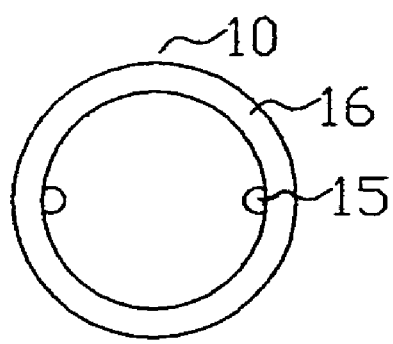
FIG. 3A is a top view of the bulb base 10 shown in FIG. 1.
Figure 3B:
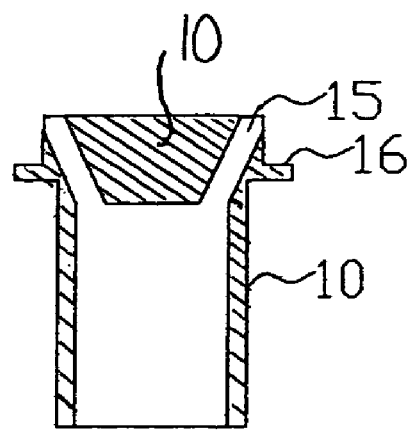
FIG. 3B is a sectional view of the bulb base 10 shown in FIG. 1.
Figure 3C:
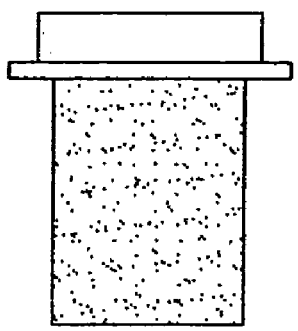
Figure 3D:
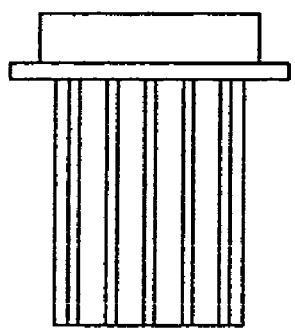

FIG. 3D is a front elevation view of a bulb base 10 having a series of vertical grooves in the lower portion.

Figure 3E:
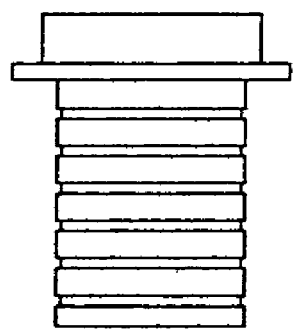

FIG. 3E is a front elevation view of a bulb base 10 having a series of circumferential grooves in the lower portion.

Figure 3F:
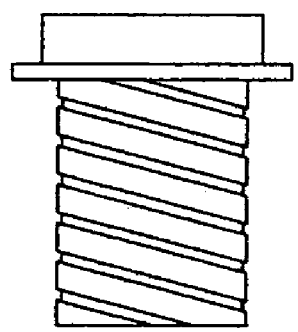

FIG. 3F is a front elevation view of a bulb base 10 having a spiral groove in the lower portion.

Figure 4:
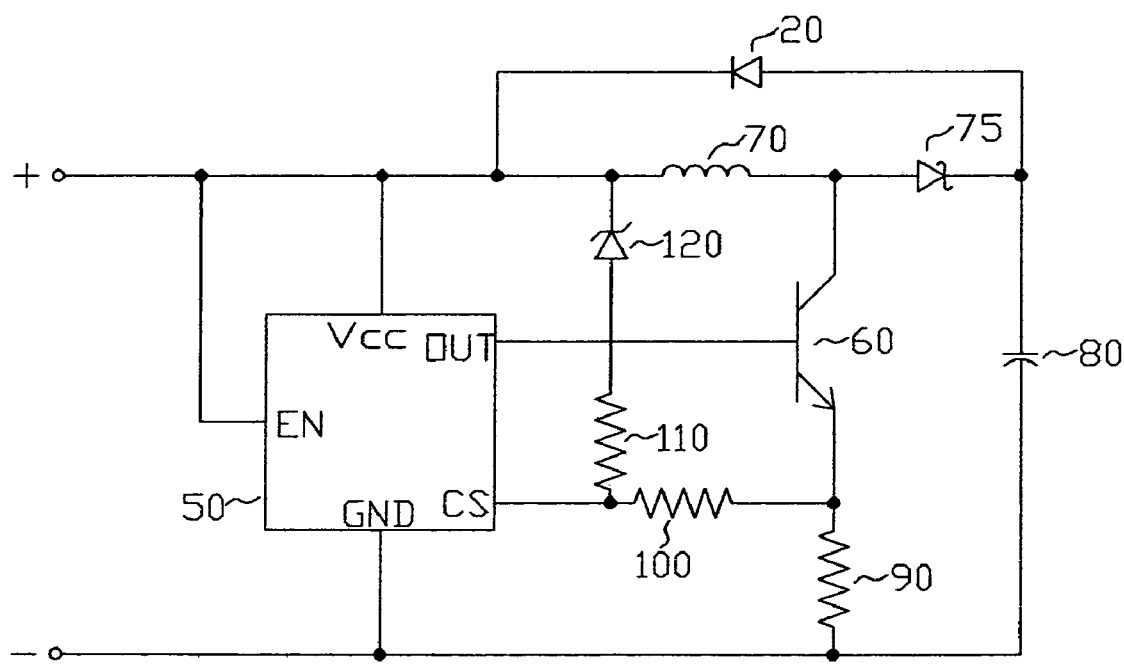

FIG. 4 is a schematic diagram of the circuit elements of a preferred embodiment of a light emitting diode assembly in accordance with the present invention.

Figure 5:
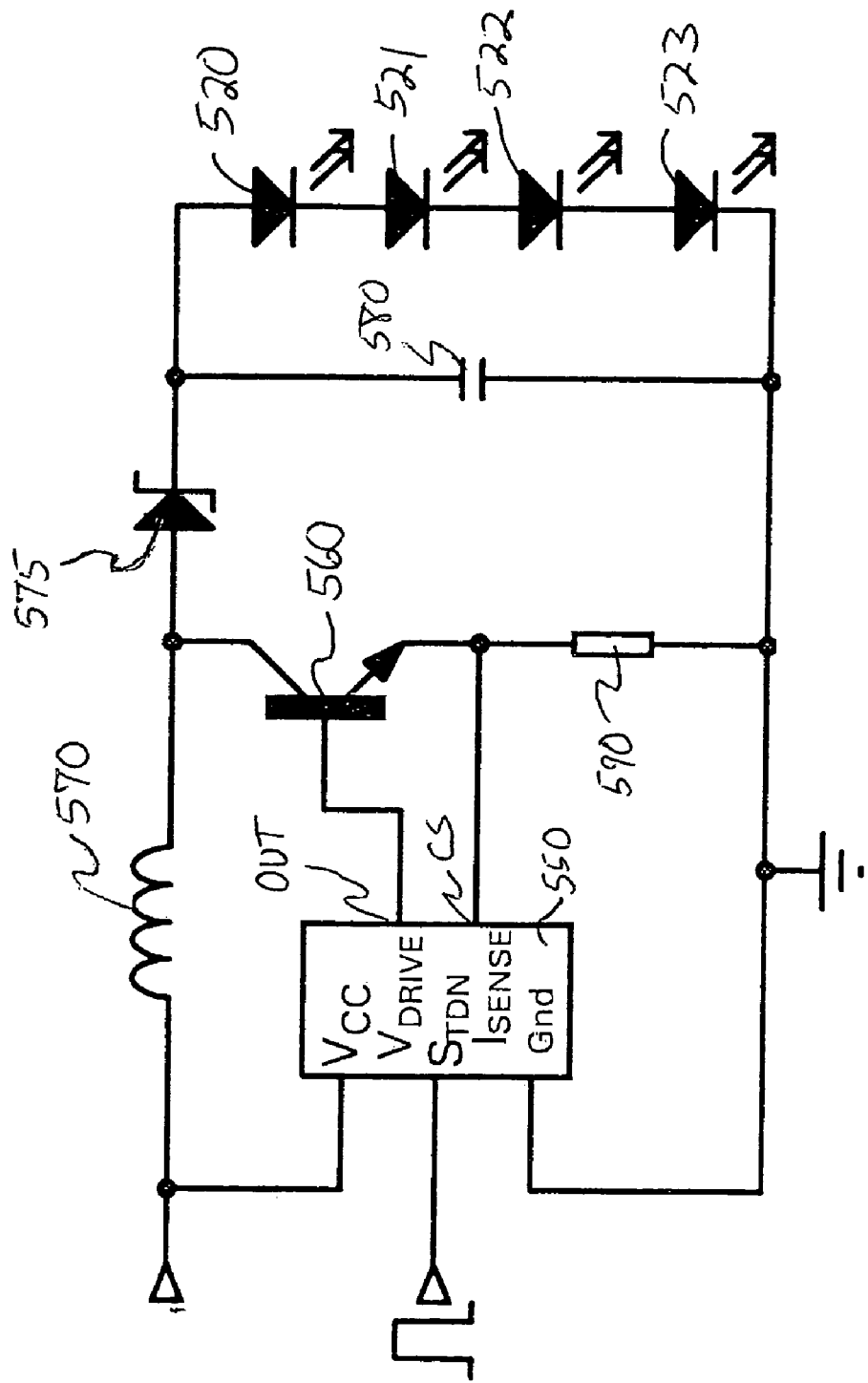

FIG. 5 is a schematic illustration of a conventional drive circuit for driving LEDs using a battery pack.

DETAILED DESCRIPTION OF THE INVENTION

As described above, in one aspect, the present invention is directed to a circuit device for providing energy to one or more electrical components (e.g., one or more LEDs), the circuit device comprising a positive contact, a negative contact, an inductor, a diode, a first component (e.g., LED) contact, a second component (e.g., LED) contact, a switch and a control device. The one or more electrical components to which energy is provided by the circuit device according to the present invention can be generally any device which operates at an elevated voltage (i.e., a voltage higher than the voltage of the energy source) and which depends on current regulation.

The positive contact and the negative contact can be any suitable structure for connection to a power source, e.g., a battery or a battery pack, a wide variety of such contacts being well known to those of skill in the art.

The inductor can be any suitable device which provides the function of an inductor, a wide variety of such devices being well known to those of skill in the art.

The diode can be any suitable device which provides the function of a diode, a wide variety of such devices being well known to those of skill in the art (one example being a Schottky rectifier).

The first and second component contacts can be any suitable structure for providing electrical connection to the electrical component(s) (e.g., an LED, or a plurality of LEDs arranged in series and/or in parallel), a wide variety of such contacts being well known to those of skill in the art.

The switch can be any suitable switching device which can selectively break or provide electrical flow between the first end of the switch and the second end of the switch. A wide variety of switching devices are well known to those of skill in the art. Preferably, the switch is selectively electronically actuated. A preferred switch is a switching transistor, a wide variety of such devices being well known to those of skill in the art.

The control device has a current sensing terminal and an output terminal, and is effective to cause the switch to break electrical connection across the switch when voltage at the current sensing terminal exceeds a threshold value, and to cause the switch to provide electrical connection across the switch after a non-conduction period has elapsed (i.e., after passage of a set amount of time after having caused the switch to break electrical connection). Any suitable control device can be used, a wide variety of such control devices being well known to those of skill in the art. An example of a suitable control device is the Zetex Type ZXSC310 LED Driver chip. A wide variety of other drive control chips exist which are capable of performing the functions described above, and any of these can be used in accordance with the present invention.

The circuit device preferably further includes a current sense resistor. The current sense resistor can be any suitable device which provides the function of a resistor, a wide variety of such devices being well known to those of skill in the art.

As described above, the circuit device preferably further includes, in addition to a current sense resistor, a current sense series resistor, a bias resistor and a Zener diode. The current sense series resistor and the bias resistor can each be any suitable device which provides the function of a resistor, a wide variety of such devices being well known to those of skill in the art. The Zener diode can be any suitable Zener diode device.

As described above, the circuit device preferably further includes a capacitor. The capacitor can be any suitable device which provides the function of a capacitor, a wide variety of such devices being well known to those of skill in the art.

As described above, the present invention is also directed to circuit devices as described above in which at least one LED is/are connected between the first and second component contacts. Any suitable LED can be used, a wide variety of LEDs being well known to those of skill in the art. Preferably the LED (or LEDs) is a high power LED.

Preferred LEDs include those which emit a high percentage of their output light from the sides of the lens. An example of this type of LED is the Luxeon Type LXHL-DR01 produced by the Lumileds Corporation. This feature helps to maximize the effects of parabolic reflectors contained in standard flashlights. This feature also allows this bulb design to be used successfully in flashlights having a built-in adjustable focus mechanism. Examples, among many, of this type of flashlight are the two to six cell models produced by MAG Instruments. Other LEDs having any of a wide variety of differing light dispersion pattens can be used in accordance with the present invention.

As described above, a further aspect of the present invention is directed to a light emitting diode receiving assembly, comprising any of the circuit devices as described above and a bulb base, the circuit device being positioned inside the bulb base. The bulb base can be formed of any suitable material (e.g., copper, brass, or any other material having comparable thermal and electrical conduction properties) and is preferably of a shape which is substantially similar to a flashlight bulb, such that the assembly can be easily dropped into a conventional flashlight to replace a flashlight bulb within the flashlight.

The bulb base preferably comprises a shoulder which provides a surface for allowing a bulb clamping mechanism in a standard flashlight to secure the bulb in place. Such a shoulder also provides a heat dissipating surface.

Preferably, an exterior surface of the bulb base is textured, thereby increasing the surface area of the exterior surface. The longevity of an LED is enhanced by limiting the maximum temperature to which it is exposed, e.g., by limiting its maximum temperature to less than 100 degrees C. This can be facilitated by making the surface area of the bulb base as large as possible. Because the outside dimensions of a standard bulb base are well defined, and cannot be exceeded if a direct replacement capability is desired, texturing is a suitable way to increase the surface area of the bulb base. Examples of suitable texturing include sand or bead blasting the shaft of the bulb base, or forming horizontal, circumferential or spiral grooves in the shaft of the bulb base. Depending upon the depth and pitch of the grooves, the surface area can be increased several times.

Preferably, the LED (or LEDs) is attached to the bulb base using a thermally conductive, electrically insulating adhesive, one example of a suitable adhesive being Loctite Type 315. By using such a thermally conductive adhesive, a low thermal impedance connection is provided between the LED (or LEDs) and the bulb base.

Preferably, insulating material is provided and at least partially fills space between the bulb base and the circuit device. Preferably the insulating material is highly thermally conductive. An example of a preferred insulating material is thermally conductive, electrically insulating epoxy.

Use of a thermally conductive insulating material assists in allowing the bulb base to provide excellent thermal dissipation to reduce the chance of excessive heating of the LED (or LEDs).

The insulating material can also assist in protecting attachment points of connecting wires (which connect the LED, or LEDs, to the circuitry) from physical damage.

As described above, another aspect of the present invention is directed to a flashlight comprising a flashlight casing, a bulb base positioned inside the casing and any of the circuit devices described above positioned inside the bulb base.

As described above, a further aspect of the present invention is directed to a circuit device comprising a positive contact, a negative contact, an inductor, a first diode, a first component (e.g., LED) contact for electrical connection to a cathode end of an electrical component, a second component (e.g., LED) contact for electrical connection to an anode end of an electrical component, a switch, a control device as described above, a current sense resistor, a current sense series resistor, a bias resistor, a Zener diode and optionally also a capacitor, the second component contact being electrically connected to the cathode end of the diode, and the first component contact being electrically connected to the negative contact. The present invention is also directed to assemblies which contain such a circuit device and flashlights which contain such assemblies. The present invention is also directed to such circuit devices, assemblies and flashlights which further include at least one LED connected between the first and second component contacts. Suitable components (i.e., diodes, resistors, switches, inductors, contacts, capacitors and electrical components) for use in these aspects of the present invention include the components described above with respect to similar respective components.

Figure 1:
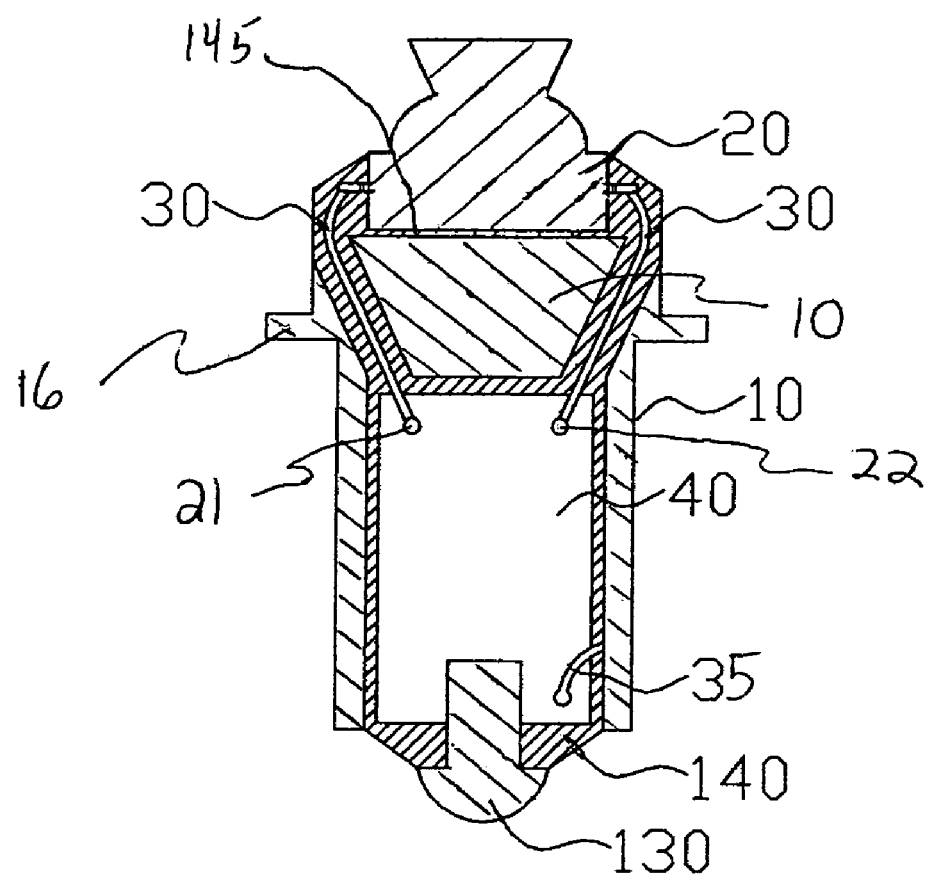
FIG. 1 is a sectional view of a preferred embodiment of a light emitting diode assembly in accordance with the present invention.

FIG. 1 is a sectional view of a preferred embodiment of a light emitting diode assembly in accordance with the present invention for use as a direct replacement for a flashlight bulb in a flashlight which employs a battery pack as its energy source. In the embodiment shown in FIG. 1, an LED 20 is affixed to the upper surface of a bulb base 10. Two connecting wires 30 provide electrical connection from the LED 20 to a printed circuit board 40. A battery contact 130 connects the circuit to the positive terminal of a battery pack (not shown). A third connecting wire 35 provides a connection between the printed circuit board 40 and the body of bulb base 10 which is, in turn, connected to the negative side of the battery pack by structures within the flashlight. LED contacts 21 and 22 are provided on the circuit board 40. The interior of the bulb base is filled with a thermally conductive, electrically insulating epoxy 140. The outside surface of the portion of the epoxy 140 which is above the bulb base (as shown in FIG. 1) and the outside surface of the portion of the epoxy 140 which is below the bulb base are molded to have a contour as shown in FIG. 1.

Figure 2:
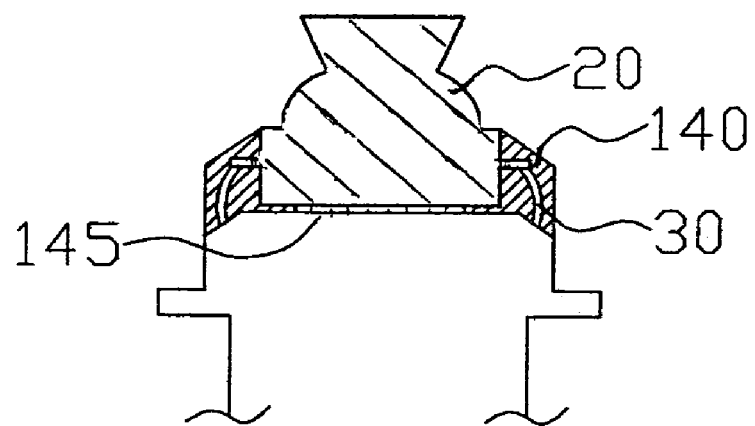
FIG. 2 is a detail showing the bonding of the LED 20 to the bulb base 10 in the embodiment shown in FIG. 1.

FIG. 2 is a detail showing the bonding of the LED 20 to the bulb base 10. The LED 20 is bonded to the bulb base 10 with a thermally conductive, electrically insulating adhesive 145. During manufacture, a fixture is preferably used to center the LED relative to the bulb base 10, as the LED is being bonded to the bulb base 10. Bonding the LED 20 to the bulb base 10 using such an adhesive (e.g., Loctite Type 315) provides a low thermal impedance connection between the LED 20 and the bulb base 10, thereby assisting in providing the desired thermal dissipation to prevent excessive heating of LED 20. FIG. 2 also shows that the epoxy 140 also protects the attachment points of the connecting wires 30 to the LED 20 against physical damage.

The shoulder 16 of the bulb base 10, shown in FIG. 1 and in FIG. 3, provides the surface necessary for the bulb clamping mechanism in a standard flashlight to secure the bulb base 10 in place. The shoulder 16 also provides a heat dissipating surface. Access holes 15 provide a means of routing connecting the wires 30 from the LED 20 to the printed circuit board 40.

FIGS. 3A–3F show several views and variations of the bulb base 10. FIG. 3A is a top view of the bulb base 10 showing two wire access holes 15 and a shoulder 16. FIG. 3B is a cross-sectional view of the bulb base 10. Fib. 3C shows a bulb base 10 with the lower portion having been textured by sand blasting, bead blasting, or other suitable process. FIG. 3D shows a bulb base 10 having a series of vertical grooves in the lower portion. FIG. 3E shows a bulb base 10 having a series of circumferential grooves in the lower portion. FIG. 3F shows a bulb base 10 having a spiral groove in the lower portion.

FIG. 4 is a schematic diagram of the circuit elements of a preferred embodiment of a light emitting diode assembly in accordance with the present invention, with all but the LED 20 and the wires 30 being positioned on the printed circuit board 40. The positive side of the battery pack is connected to the power input terminal (VCC) and the enable terminal (EN) of the control chip 50, one end of the inductor 70, the cathode of the LED 20, and the cathode of the Zener diode 120. The negative side of the battery pack is connected to the ground (GND) terminal of the control chip 50, one end of the current sense resistor 90 and one end of the capacitor 80. The output terminal (OUT) of the control chip 50 is connected to the base of the switching transistor 60. The current sense terminal (CS) of the control chip 50 is connected to the junction of the current sense series resistor 100 and the bias resistor 110. The other end of the bias resistor 110 is connected to the anode of the Zener diode 120. The other end of the current sense series resistor 100 is connected to the junction of the current sense resistor 90 and the emitter of the switching transistor 60. The collector of the switching transistor 60 is connected to the junction of the inductor 70 and the anode of the Schottky rectifier 75. The anode of the LED 20 is connected to the junction of the cathode of the Schottky rectifier 75 and the capacitor 80.

In the circuit arrangement depicted in FIG. 4, the cathode of the LED 20 is returned to the positive terminal of the power source (e.g., battery pack). In this configuration, the voltage boost created by the inductor 70 will always be equal to the forward voltage drop of the LED 20 plus the forward voltage drop of the diode 75.

In addition, in the circuit arrangement depicted in FIG. 4, the current sense series resistor 100 and the bias resistor 110 form a summing junction at the CS terminal of the control chip 50. As the input voltage is increased, the Zener diode 120 supplies current to the bias resistor 110. Because the voltage at the CS terminal is the result of the sum of the voltages created by the bias resistor 110 and the current sense series resistor 100 and has a fixed value, as the voltage contributed by the bias resistor 110 increases, the voltage required across the current sense resistor 90 to achieve the threshold value decreases. Thus, the current through the current sense resistor 90 decreases as voltage increases and constant energy storage in the inductor 70 is achieved, resulting in constant power being delivered to the LED 20. This arrangement can thereby compensate in the event that higher stored energy is experienced as a result of a higher input voltage.

From the above description, those of skill in the art will readily appreciate that devices according to the present invention:

can be used to provide two to three times the light output of a standard incandescent flashlight bulb;

can operate in flashlights incorporating one to six standard cells including alkaline, NiCad, or lithium types;

can contain the driver within the bulb base;

can eliminate breakage problems associated with the glass enclosed, filamentary, incandescent light bulb;

can provide a much longer operating life than ordinary incandescent light bulbs;

can provide an emission pattern which maximizes the effectiveness of the parabolic reflector contained in standard flashlights;

allows the use of variable focus arrangements contained within many standard flashlights;

can provide thermal management to control the heat dissipation of the LED and drive electronics, thereby protecting the LED against excessive heating.

The present invention thus provides:

a replacement bulb for flashlights comprising a high output power LED, a high efficiency driver and a heat dissipating base;

the capability to use an LED having the greater part of its light emission in a direction normal to its vertical axis to permit its use in adjustable focus flashlights and to maximize the efficiency of the parabolic reflector used in standard flashlights;

the capability to use a constant power driver to permit operation from a battery pack of 1 to 6 alkaline cells;

an arrangement of the LED connection to the driver to permit the driver to always operate in the boost mode;

the capability to use a compensating circuit in the driver to accomplish a constant power output;

the incorporation of a driver circuit within a bulb base; and a method of increasing the effective surface area of a bulb base to improve thermal dissipation characteristics.

Any two or more structural parts of the devices described above can be integrated. Any structural part of the devices described above can be provided in two or more parts (which are held together, if necessary). Similarly, any two or more functions can be conducted simultaneously, and/or any function can be conducted in a series of steps.

What is claimed is:

1. A circuit device for providing energy to at least one electrical component, said circuit device comprising:
   a positive contact;
   a negative contact;
   an inductor;
   a diode having a cathode end and an anode end;
   a first component contact for electrical connection to a cathode end of an electrical component;
   a second component contact for electrical connection to an anode end of an electrical component;
   a switch; and
   a control device,
   a first end of said inductor being electrically connected to said positive contact;
   a second end of said inductor being electrically connected to said anode end of said diode;
   a first end of said switch being electrically connected to a junction between said second end of said inductor and said anode end of said diode;
   a second end of said switch being electrically connected to said negative contact;

said second component contact being electrically connected to said cathode end of said diode;
said first component contact being electrically connected to a junction between said positive contact and said first end of said inductor;
said control device having a current sensing terminal and an output terminal, said current sensing terminal being electrically connected to a junction between said second end of said switch and said negative contact, said output terminal being electrically connected to said switch, said control device causing said switch to break electrical connection across said switch when voltage at said current sensing terminal exceeds a threshold value, and causing said switch to provide electrical connection across said switch after a non-conduction period has elapsed following said causing said switch to break electrical connection.

2. A circuit device as recited in claim 1, wherein said switch comprises a switching transistor having a collector, a base and an emitter, said collector being electrically connected to said junction between said second end of said inductor and said anode end of said diode, said base being electrically connected to said output terminal of said control device, and said emitter being electrically connected to said negative contact.

3. A circuit device as recited in claim 1, further comprising a current sense resistor having a first end and a second end, said first end of said current sense resistor being electrically connected to a junction between said second end of said switch and said current sensing terminal, said second end of said current sense resistor being electrically connected to said negative terminal.

4. A circuit device as recited in claim 1, further comprising a current sense resistor, a current sense series resistor, a bias resistor and a Zener diode,
said current sense resistor having a first end and a second end,
said current sense series resistor having a first end and a second end,
said bias resistor having a first end and a second end,
said Zener diode having a cathode end and an anode end,
said cathode end of said Zener diode being electrically connected to a junction between said positive contact and said first end of said inductor, said anode end of said Zener diode being electrically connected to said first end of said bias resistor,
said second end of said bias resistor being electrically connected to a junction between said first end of said current sense series resistor and said current sensing terminal,
said second end of said current sense series resistor being electrically connected to a junction between said second end of said switch and said first end of said current sense resistor,
said second end of said current sense resistor being electrically connected to said negative terminal.

5. A circuit device as recited in claim 1, further comprising a capacitor having a first end and a second end, said first end of said capacitor being electrically connected to a junction between said cathode end of said diode and said second component contact, said second end of said capacitor being electrically connected to a junction between said second end of said switch and said negative contact.

6. A circuit device as recited in claim 1, wherein said switch comprises a switching transistor having a collector, a base and an emitter,
said circuit device further comprising a current sense resistor, a current sense series resistor, a bias resistor, a Zener diode and a capacitor,
said current sense resistor having a first end and a second end,
said current sense series resistor having a first end and a second end,
said bias resistor having a first end and a second end,
said Zener diode having a cathode end and an anode end,
said capacitor having a first end and a second end,
said cathode end of said Zener diode being electrically connected to a junction between said positive contact and said first end of said inductor, said anode end of said Zener diode being electrically connected to said first end of said bias resistor,
said second end of said bias resistor being electrically connected to a junction between said first end of said current sense series resistor and said current sensing terminal,
said second end of said current sense series resistor being electrically connected to said first end of said current sense resistor,
said second end of said current sense resistor being electrically connected to said negative terminal,
said collector being electrically connected to said junction between said second end of said inductor and said anode end of said diode, said base being electrically connected to said output terminal of said control device, and said emitter being electrically connected to a junction between said second end of said current sense series resistor and said first end of said current sense resistor,
said first end of said capacitor being electrically connected to a junction between said cathode end of said diode and said second component contact, said second end of said capacitor being electrically connected to a junction between said second end of said current sense resistor and said negative contact.

7. A circuit device as recited in claim 1, wherein said electrical component is an LED.

8. An electrical component receiving assembly, comprising:
a circuit device as recited in claim 1; and
a bulb base, said circuit device being positioned inside said bulb base.

9. An electrical component receiving assembly as recited in claim 8, further comprising insulating material at least partially filling space between said bulb base and said circuit device.

10. An electrical component receiving assembly as recited in claim 8, wherein an exterior surface of said bulb base is textured, thereby increasing a surface area of said exterior surface.

11. A flashlight, comprising:
a casing;
a bulb base, said bulb base being positioned inside said casing; and
a circuit device as recited in claim 1, said circuit device being positioned inside said bulb base.

12. A flashlight as recited in claim 11, further comprising insulating material at least partially filling space between said bulb base and said circuit device.

13. A flashlight as recited in claim 11, wherein an exterior surface of said bulb base is textured, thereby increasing a surface area of said exterior surface.

14. A light emitting diode-containing device comprising:
a positive contact;

a negative contact;

an inductor;

a diode having a cathode end and an anode end;

a light emitting diode component having a cathode end and an anode end;

a switch; and a control device, a first end of said inductor being electrically connected to said positive contact;

a second end of said inductor being electrically connected to said anode end of said diode;

a first end of said switch being electrically connected to a junction between said second end of said inductor and said anode end of said diode;

a second end of said switch being electrically connected to said negative contact;

said anode end of said light emitting diode component being electrically connected to said cathode end of said diode;

said cathode end of said light emitting diode component being electrically connected to a junction between said positive contact and said first end of said inductor;

said control device having a current sensing terminal and an output terminal, said current sensing terminal being electrically connected to a junction between said second end of said switch and said negative contact, said output terminal being electrically connected to said switch, said control device causing said switch to break electrical connection across said switch when voltage at said current sensing terminal exceeds a threshold value, and causing said switch to provide electrical connection across said switch after a non-conduction period has elapsed following said causing said switch to break electrical connection.

15. A light emitting diode-containing device as recited in claim 14, wherein said switch comprises a switching transistor having a collector, a base and an emitter, said collector being electrically connected to said junction between said second end of said inductor and said anode end of said diode, said base being electrically connected to said output terminal of said control device, and said emitter being electrically connected to said negative contact.

16. A light emitting diode-containing device as recited in claim 14, further comprising a current sense resistor having a first end and a second end, said first end of said current sense resistor being electrically connected to a junction between said second end of said switch and said current sensing terminal, said second end of said current sense resistor being electrically connected to said negative terminal.

17. A light emitting diode-containing device as recited in claim 14, further comprising a current sense resistor, a current sense series resistor, a bias resistor and a Zener diode, said current sense resistor having a first end and a second end, said current sense series resistor having a first end and a second end, said bias resistor having a first end and a second end, said Zener diode having a cathode end and an anode end, said cathode end of said Zener diode being electrically connected to a junction between said positive contact and said first end of said inductor, said anode end of said Zener diode being electrically connected to said first end of said bias resistor, said second end of said bias resistor being electrically connected to a junction between said first end of said current sense series resistor and said current sensing terminal, said second end of said current sense series resistor being electrically connected to a junction between said second end of said switch and said first end of said current sense resistor, said second end of said current sense resistor being electrically connected to said negative terminal.

18. A light emitting diode-containing device as recited in claim 14, further comprising a capacitor having a first end and a second end, said first end of said capacitor being electrically connected to a junction between said cathode end of said diode and said anode end of said light emitting diode component, said second end of said capacitor being electrically connected to a junction between said second end of said switch and said negative contact.

19. A light emitting diode-containing device as recited in claim 14, wherein said switch comprises a switching transistor having a collector, a base and an emitter, said device further comprising a current sense resistor, a current sense series resistor, a bias resistor, a Zener diode and a capacitor, said current sense resistor having a first end and a second end, said current sense series resistor having a first end and a second end, said bias resistor having a first end and a second end, said Zener diode having a cathode end and an anode end, said capacitor having a first end and a second end, said cathode end of said Zener diode being electrically connected to a junction between said positive contact and said first end of said inductor, said anode end of said Zener diode being electrically connected to said first end of said bias resistor, said second end of said bias resistor being electrically connected to a junction between said first end of said current sense series resistor and said current sensing terminal, said second end of said current sense series resistor being electrically connected to said first end of said current sense resistor, said second end of said current sense resistor being electrically connected to said negative terminal, said collector being electrically connected to said junction between said second end of said inductor and said anode end of said diode, said base being electrically connected to said output terminal of said control device, and said emitter being electrically connected to a junction between said second end of said current sense series resistor and said first end of said current sense resistor, said first end of said capacitor being electrically connected to a junction between said cathode end of said diode and said anode end of said light emitting diode component, said second end of said capacitor being electrically connected to a junction between said second end of said current sense resistor and said negative contact.

20. A light emitting diode-containing device as recited in claim 14, wherein said light emitting diode component comprises a plurality of LEDs.

21. A light emitting diode-containing device as recited in claim 14, wherein said light emitting diode component produces light emission, a greater part of said light emission being in a direction normal to a vertical axis of said light emitting diode component.

22. A light emitting diode assembly, comprising:
a device as recited in claim 14; and
a bulb base, said light emitting diode component being secured to said bulb base, at least a portion of said device being positioned inside said bulb base.

23. A light emitting diode assembly as recited in claim 22, further comprising insulating material at least partially filling space between said bulb base and said device.

24. A light emitting diode assembly as recited in claim 22, wherein said light emitting diode component is bonded to said bulb base with an electrically insulating adhesive material.

25. A light emitting diode assembly as recited in claim 22, wherein an exterior surface of said bulb base is textured, thereby increasing a surface area of said exterior surface.

26. A light emitting diode assembly as recited in claim 22, wherein said light emitting diode component produces light emission, a greater part of said light emission being in a direction normal to a vertical axis of said light emitting diode component.

27. A flashlight, comprising:
a casing;
a bulb base, said bulb base being positioned inside said casing; and
a device as recited in claim 14, at least a portion of said device being positioned inside said bulb base.

28. A flashlight as recited in claim 27, further comprising insulating material at least partially filling space between said bulb base and said device.

29. A flashlight as recited in claim 27, wherein an exterior surface of said bulb base is textured, thereby increasing a surface area of said exterior surface.

30. A flashlight as recited in claim 27, wherein said light emitting diode component produces light emission, a greater part of said light emission being in a direction normal to a vertical axis of said flashlight.

31. A circuit device for providing energy to at least one electrical component, said circuit device comprising:
a positive contact;
a negative contact;
an inductor;
a first diode having a cathode end and an anode end;
a first component contact for electrical connection to a cathode end of an electrical component;
a second component contact for electrical connection to an anode end of an electrical component;
a switch;
a control device having a current sensing terminal and an output terminal;
a current sense series resistor having a first end and a second end;
a bias resistor having a first end and a second end; and
a Zener diode having a cathode end and an anode end,
a first end of said inductor being electrically connected to said positive contact;
a second end of said inductor being electrically connected to said anode end of said first diode;
a first end of said switch being electrically connected to a junction between said second end of said inductor and said anode end of said first diode;
a second end of said switch being electrically connected to said negative contact;
said second component contact being electrically connected to said cathode end of said first diode;
said first component contact being electrically connected to said negative contact;
said cathode end of said Zener diode being electrically connected to a junction between said positive contact and said first end of said inductor, said anode end of said Zener diode being electrically connected to said first end of said bias resistor,
said second end of said bias resistor being electrically connected to a junction between said first end of said current sense series resistor and said current sensing terminal,
said second end of said current sense series resistor being electrically connected to a junction between said second end of said switch and said negative terminal;
said output terminal being electrically connected to said switch, said control device causing said switch to break electrical connection across said switch when voltage at said current sensing terminal exceeds a threshold value, and causing said switch to provide electrical connection across said switch after a non-conduction period has elapsed following said causing said switch to break electrical connection.

32. A circuit device as recited in claim 31, further comprising a capacitor having a first end and a second end, said first end of said capacitor being electrically connected to a junction between said cathode end of said first diode and said second component contact, said second end of said capacitor being electrically connected to said negative contact.

33. A circuit device as recited in claim 31, wherein said electrical component comprises at least one LED.

34. A circuit device as recited in claim 31, further comprising a current sense resistor having a first end and a second end, said first end of said current sense resistor being electrically connected to a junction between said second end of said current sense series resistor and said second end of said switch, said second end of said current sense resistor being electrically connected to said negative contact.

35. A circuit device as recited in claim 31, wherein said light emitting diode component produces light emission, a greater part of said light emission being in a direction normal to a vertical axis of said light emitting diode component.

36. A method of directly replacing a flashlight bulb, comprising:
inserting into a flashlight body a light emitting diode assembly as recited in claim 22.

* * * * *